(12) United States Patent
Marcinkiewicz

(10) Patent No.: US 8,583,164 B2
(45) Date of Patent: Nov. 12, 2013

(54) REWARD-BASED ACCESS TO MEDIA CONTENT

(75) Inventor: Walter M. Marcinkiewicz, Chapel Hill, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1333 days.

(21) Appl. No.: 11/776,790

(22) Filed: Jul. 12, 2007

(65) Prior Publication Data

US 2009/0017750 A1   Jan. 15, 2009

(51) Int. Cl.
| | |
|---|---|
| H04M 3/42 | (2006.01) |
| H04M 3/00 | (2006.01) |
| H04M 1/00 | (2006.01) |
| H04L 29/06 | (2006.01) |
| H04B 7/00 | (2006.01) |

(52) U.S. Cl.
USPC .................. 455/550.1; 455/414.1; 455/414.3; 455/418; 455/517; 455/556.2

(58) Field of Classification Search
USPC ............ 455/3.03, 41.2, 403, 405–406, 414.1, 455/414.3, 418, 500, 550.1, 514, 517–518, 455/520, 556.2, 566; 705/14.1–14.13, 705/14.19, 14.23, 14.49, 14.64, 14.69–14.7
See application file for complete search history.

(56) References Cited

U.S. PATENT DOCUMENTS

| | | | |
|---|---|---|---|
| 7,562,112 B2* | 7/2009 | Harrow et al. ................ | 709/203 |
| 7,831,199 B2* | 11/2010 | Ng et al. ....................... | 455/3.06 |
| 2002/0007350 A1* | 1/2002 | Yen ................................ | 705/52 |
| 2002/0138471 A1 | 9/2002 | Dutta et al. | |
| 2002/0165979 A1* | 11/2002 | Vincent ......................... | 709/239 |
| 2004/0236945 A1* | 11/2004 | Risan et al. .................... | 713/165 |
| 2005/0154608 A1* | 7/2005 | Paulson et al. ..................... | 705/1 |
| 2006/0112143 A1* | 5/2006 | Subramanian ............. | 707/104.1 |
| 2006/0173784 A1* | 8/2006 | Marples et al. ................. | 705/52 |
| 2007/0179897 A1* | 8/2007 | Andersson ...................... | 705/59 |
| 2007/0299737 A1* | 12/2007 | Plastina et al. ................. | 705/26 |
| 2008/0089299 A1* | 4/2008 | Lindsley et al. .............. | 370/338 |

FOREIGN PATENT DOCUMENTS

WO   2008/030759 A1   3/2008

OTHER PUBLICATIONS

PCT—International Search Report dated Aug. 18, 2008, for Application No. PCT/US2008/057474, Filed Mar. 19, 2008.

* cited by examiner

*Primary Examiner* — Meless Zewdu

(74) *Attorney, Agent, or Firm* — Coats & Bennett, P.L.L.C.

(57) ABSTRACT

The present invention provides a reward-based process where sharing mobile devices receive a reward for sharing access to media content with one or more requesting mobile devices. A requesting mobile device asks the wireless communication system for access to media content via a sharing mobile device. A content provider identifies a sharing mobile device with the desired media content to the requesting mobile device. Subsequently, the requesting mobile device requests and receives access to the desired media content via the sharing mobile device. An accounting unit associated with the content provider accrues a reward for a user of the sharing mobile device that rewards the user for providing the requesting mobile device with access to the media content.

11 Claims, 6 Drawing Sheets

REWARD-BASED ACCESS TO MEDIA CONTENT

BACKGROUND

The present invention relates generally to distribution of media content in a wireless network, and more particularly to reward-based sharing of media content between multiple mobile devices in the wireless network.

The introduction of enhanced data services for wireless networks has resulted in an explosion of mobile devices, such as cell phones, Personal Digital Assistants (PDAs), laptop computers, etc., that provide both voice and enhanced data services. Enhanced data services enable a user of the mobile device to browse web pages, compose and read e-mail messages or instant messages, download media content from Internet servers, and exchange digital photographs or images with other mobile devices.

To gain a competitive edge, mobile device manufacturers expend significant resources devising improved mobile devices with a variety of enhanced data services. The high-end mobile devices that result from this effort typically have a technical advantage over their lower-end counterparts. For example, high-end devices may have more memory storage, a higher data rate, and/or a higher processing rate than a lower-end device. However, the high price tag of these high-end devices coupled with the short life cycle of a typical mobile device (~18 months) causes consumers to be reluctant to purchase the high-end devices. Further, high-end devices often have more technical resources and features than average consumers believe they need. Thus, manufacturers continue to explore ways to increase the appeal of high-end mobile devices.

SUMMARY

The present invention encourages the use of higher-end mobile communication devices by providing a reward-based process where sharing mobile devices receive a reward for sharing access to media content with one or more requesting mobile devices. In one embodiment, a requesting mobile device sends a media request to a content provider in the wireless communication system, wherein the media request includes a remote storage request for media content stored in the content provider. The content provider identifies and selects a sharing mobile device that is storing and allowing access to the media content. In one exemplary embodiment, the sharing mobile device may download the media content from the content provider responsive to the media request initiated by the requesting mobile device. The content provider sends a media response to the requesting mobile device, where the media response identifies the selected sharing mobile device. The requesting mobile device subsequently sends an access request to the identified sharing mobile device. Responsive to receiving the access request, the sharing mobile device provides the requesting mobile device with access to the desired media content. An accounting unit associated with the content provider accrues a reward for a user of the sharing mobile communication device that rewards the user for providing the requesting mobile device with access to the media content. In one embodiment, the accounting unit accrues the reward each time the sharing mobile device provides another mobile device with access to media content stored on the sharing mobile device.

DETAILED DESCRIPTION

The present invention establishes a reward system that rewards users for sharing the technical resources of their mobile devices with other mobile devices. As used herein, the term "mobile device" may comprise a cell phone, a Personal Communication System (PCS) terminal, a Personal Digital Assistant (PDA), a conventional laptop and/or palmtop receiver, or any type of mobile communication device. The following describes the invention in terms of sharing and requesting mobile devices. In general, the sharing mobile device has more available resources or features, such as memory, than the requesting mobile device. In one embodiment, the sharing mobile device is a premium mobile device, such as a high-end or mid-range model, and the requesting mobile device is a standard mobile device, such as a low-end or older model. The following describes the invention in terms of a sharing mobile device that has more available memory than the requesting mobile device. Other technical features, such as data rate capability, processing capability, etc., may also be used to distinguish the sharing mobile devices from the requesting mobile devices.

Figure 1:
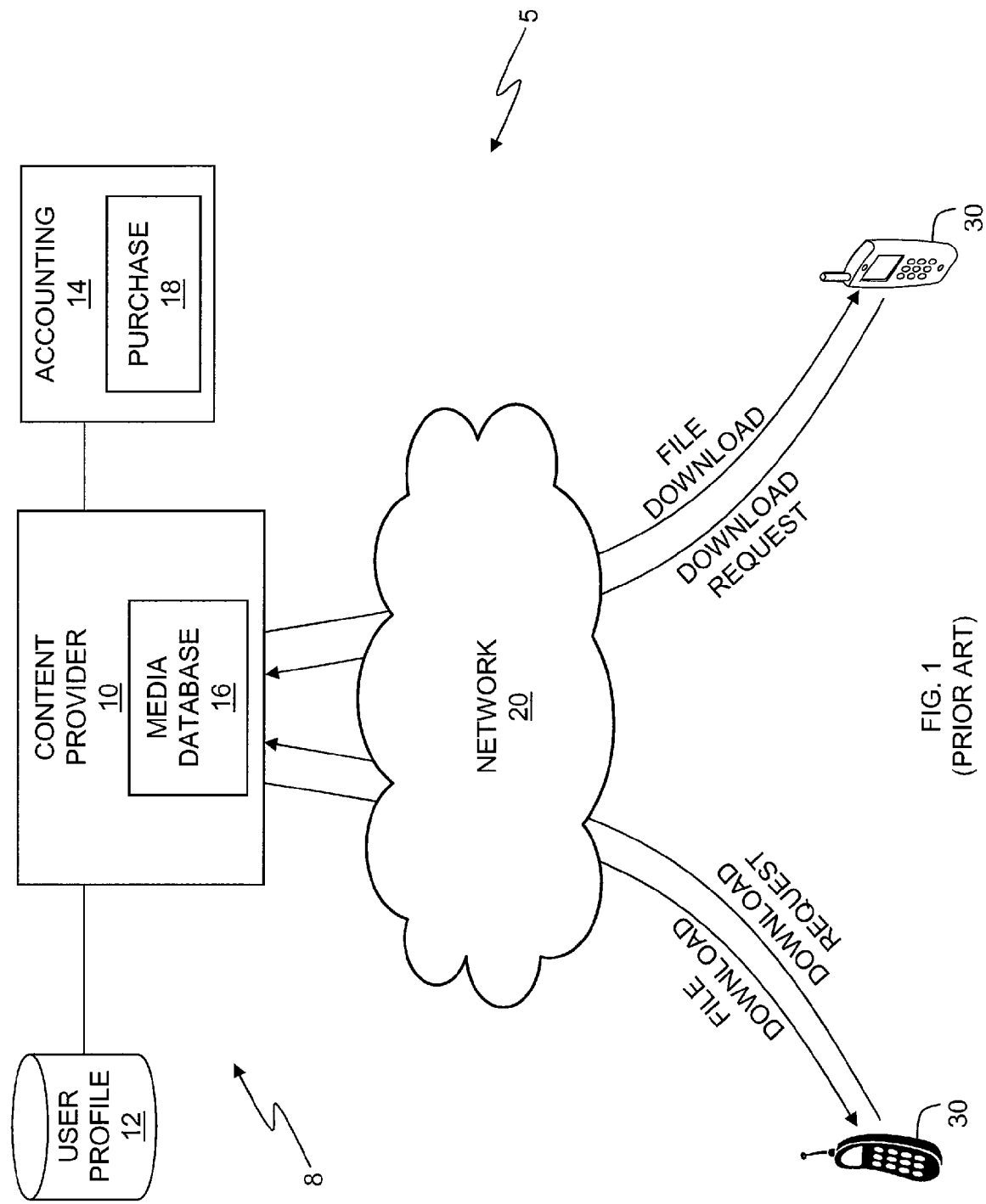
FIG. 1 shows a wireless communication system.

FIG. 1 shows an exemplary wireless communication system 5 comprising a media distribution system 8, wireless network 20, and multiple mobile devices 30. The media distribution system 8 comprises a content provider 10, user profile unit 12, and accounting unit 14. Content provider 10 comprises a server that provides media content from a media database 16 to the mobile devices 30 via wireless network 20 according to any wireless protocol, e.g., GSM/GPRS, EDGE, WCDMA, WiFi, and OFDM. Exemplary media content includes audio content, video content, pictures, etc. User profile unit 12 stores user profile information for each mobile device 30 in the system 5. Accounting unit 14 comprises a purchase unit 18 that tracks fees associated with media content downloads to each mobile device 30.

To download media content from the content provider 10 in a conventional wireless communication system 5, a mobile device 30 sends a download request to the content provider 10 via the network 20. In response, the content provider 10 retrieves the requested media content from media database 16 and downloads the retrieved media content to the mobile device 30. Further, purchase unit 18 accrues a download charge for the user of the mobile device 30. Other mobile devices 30 require a similar procedure to download media content from the content provider 10. Requiring each mobile device 30 to separately download the same media content from content provider 10 ties up network resources and does not take advantage of the potentially underutilized resources of some mobile devices 30.

Figure 2:
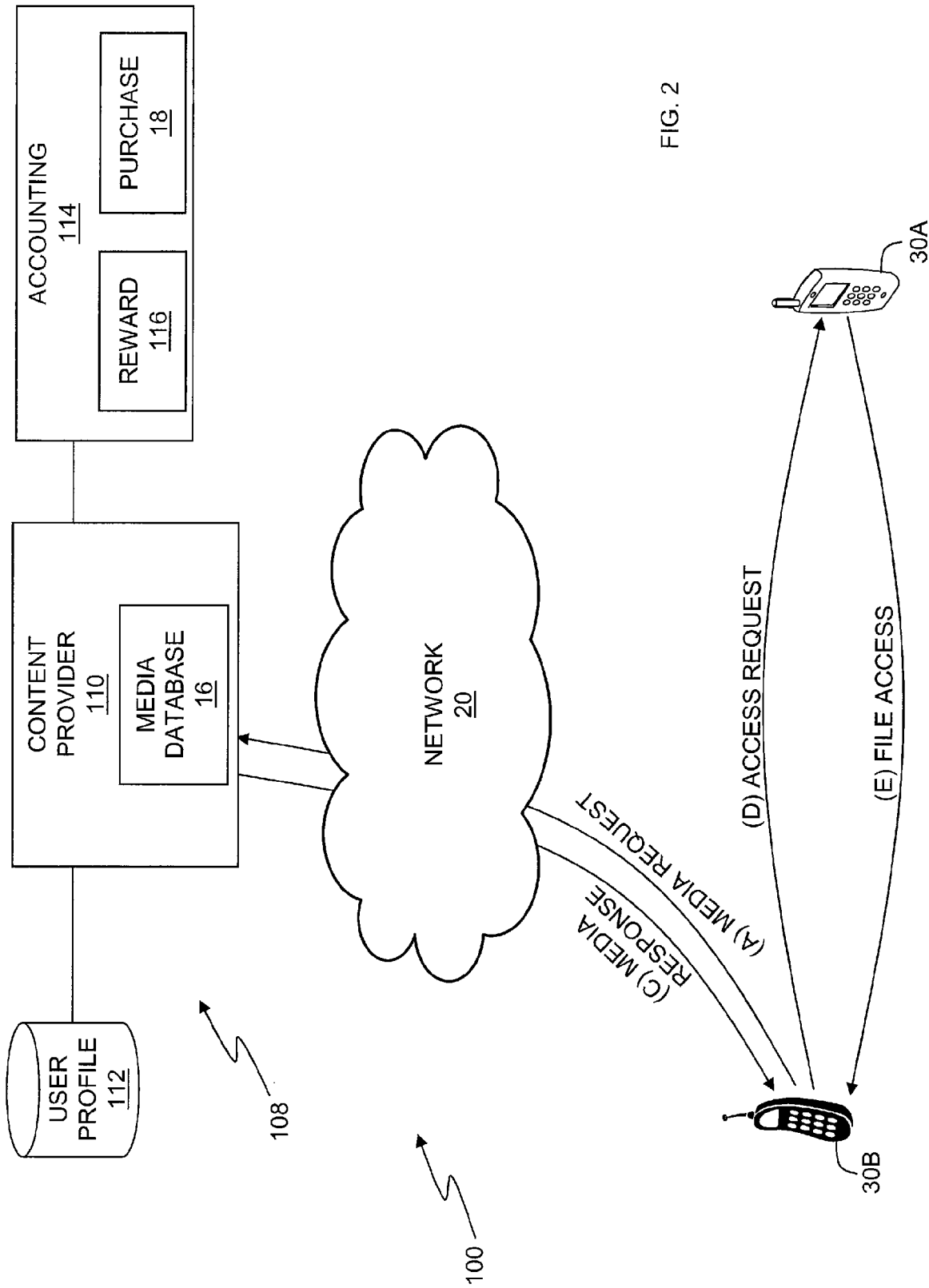
FIG. 2 shows a wireless communication system according to one exemplary embodiment of the present invention.
Figure 3:
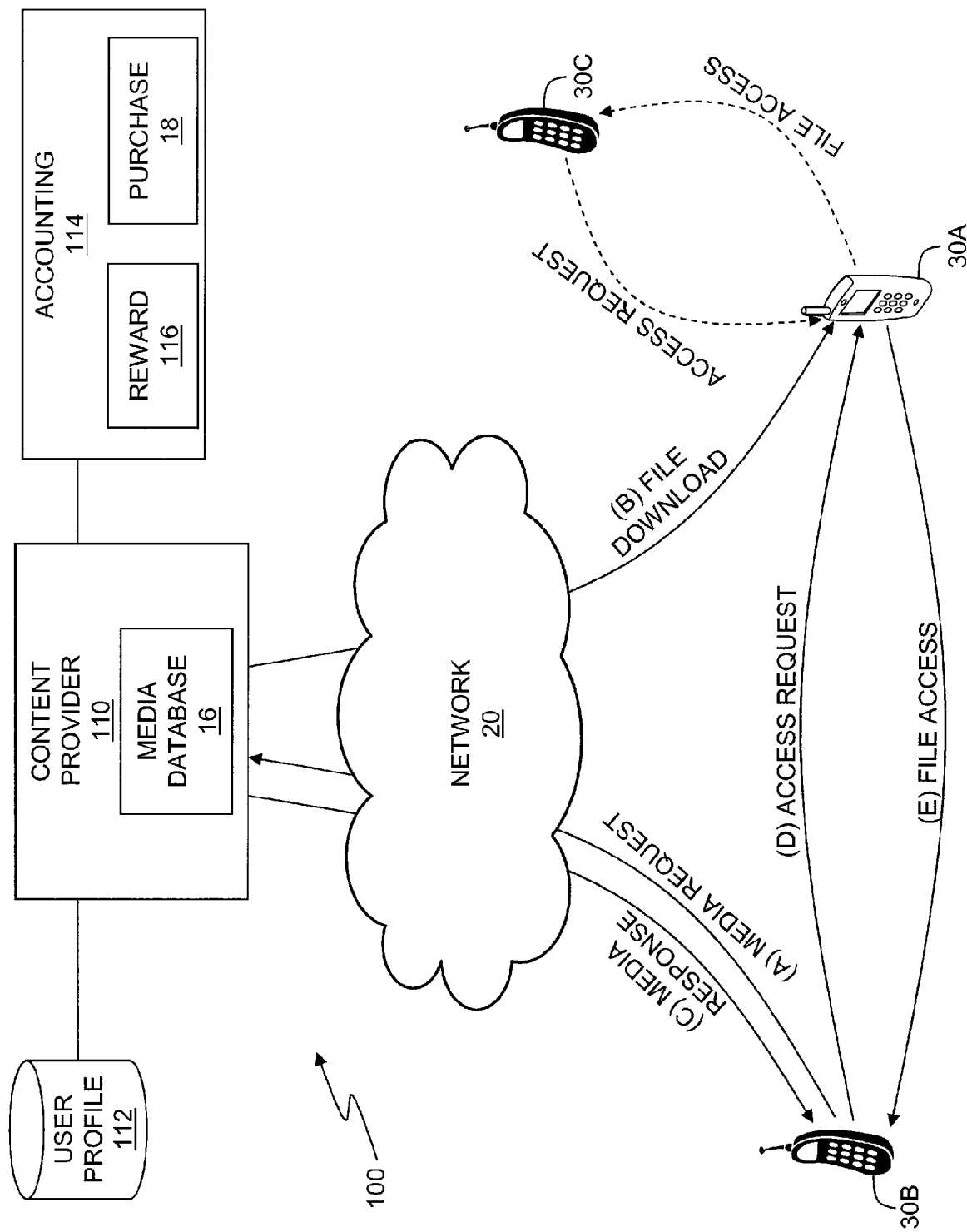
FIG. 3 shows a wireless communication system according to another exemplary embodiment of the present invention.

FIGS. 2 and 3 show a wireless communication system 100 according to exemplary embodiments of the present invention. The wireless communication system 100 includes network 20, multiple mobile devices 30, e.g., a sharing mobile device 30A and a requesting mobile device 30B, and a media distribution system 108, which comprises a content provider 110, user profile unit 112, and accounting unit 114. Generally, the media distribution system 108 facilitates a process that enables the requesting mobile device 30B to access desired content from a sharing mobile device 30A without requiring the requesting mobile device 30B to directly download the desired content from the content provider 110. More particularly, the content provider 110 controls the sharing process associated with media content stored in the media database 16. The user profile unit 112 maintains a record of the media content stored in one or more sharing mobile devices 30A, and may store sharing parameters and/or technical features associated with the sharing mobile devices 30A. The accounting unit 114 includes a purchase unit 18 and a reward unit 116. The purchase unit 18 accrues charges for access to media content, while the reward unit 116 accrues rewards associated with sharing access to media content, as discussed further below. While not explicitly shown, it will be appreciated that content provider 110, user profile unit 112, and/or accounting unit 114 may be incorporated with network 20.

To access desired media content, requesting mobile device 30B sends a media request to the content provider 110 (A, FIGS. 2 and 3). The media request identifies the desired media content and includes a remote storage request. The remote storage request instructs content provider 110 to facilitate a file sharing process without directly downloading the identified content from the content provider 110 to the requesting mobile device 30B. Responsive to the media request, content provider 110 searches the user profile unit 112 to identify and select a sharing mobile device 30A for providing the requesting mobile device 30B with access to the desired media content. In one embodiment, the content provider 110 identifies and selects a sharing mobile device 30A that already has the desired media content. In another embodiment, the content provider 110 identifies a mobile device available to act as a sharing mobile device 30A, and downloads the desired media content to the selected sharing mobile device 30A (B, FIG. 3). In either case, the content provider 110 subsequently sends a media response to the requesting mobile device 30B that identifies the selected sharing mobile device 30A (C, FIGS. 2 and 3).

The requesting mobile device 30B sends an access request to the identified sharing mobile device 30A (D, FIGS. 2 and 3). The sharing mobile device 30A provides the requesting mobile device 30B with access to the desired media content responsive to the access request by either downloading or streaming the media content to the requesting mobile device 30B using any known protocol, e.g., MSRP, RTP, FTP, etc. (E, FIGS. 2 and 3). In one embodiment, the sharing mobile device 30A provides access to the desired media content using a short-range wireless communication link, e.g., an infra-red link, Bluetooth link, etc. In another embodiment, the sharing mobile device 30A provides access to the desired media content using a long-range wireless communication link via network 20.

To encourage use of the sharing process described herein, reward unit 116 may accrue a reward for the user of the selected sharing mobile device 30A when the sharing mobile device 30A provides the requesting mobile device 30B with access to the media content. The reward may be provided by the content provider operator, network operator, the mobile device manufacturer, and/or the user of the requesting mobile device 30A, and may comprise any suitable reward, e.g., a cash reward, subscription discount, etc.

Reward unit 116 may accrue the reward based on information provided by the content provider 110 and/or the sharing mobile device 30A. For example, the content provider 110 and/or the sharing mobile device 30A may notify the reward unit 116 each time requesting mobile device 30B accesses media content from a sharing mobile device 30A. The reward unit 116 accrues the reward according to predetermined accrual procedures. For example, the reward unit 116 may accrue the reward each time the sharing mobile device 30A provides a requesting mobile device 30B with access to media content. Alternatively, the reward unit 116 may only accrue the reward the first time a requesting mobile device 30B makes a media request or the first time a requesting mobile device 30B accesses the media content.

Content provider 110 selects the sharing mobile device 30A based on technical features of the sharing device 30A and/or one or more sharing parameters stored in user profile unit 112. For example, the content provider 110 may select the sharing mobile device 30A having the most available memory resources and/or located closest to the requesting mobile device 30B. Other exemplary technical features/sharing parameters include, but are not limited to, communication resources available to the requesting and/or sharing mobile devices 30B, 30A, relationship (if any) between the requesting and sharing mobile devices 30B, 30A, sharing parameters set by the candidate sharing mobile devices 30A, etc. For example, the content provider 110 may select the sharing mobile device 30A having the highest potential data rate and/or may select the sharing mobile device 30A belonging to the same group, e.g., family group, as the requesting mobile device 30B. As shown in FIG. 2, the content provider 110 may select a sharing mobile device 30A currently storing the desired media content. Alternatively, as shown in FIG. 3, content provider 110 may select a sharing mobile device 30A based on the technical features and/or sharing parameters and download the desired media content to the selected sharing mobile device 30A to enable the sharing mobile device 30A to share the media content with the requesting mobile device 30B.

The user of the sharing mobile device 30A may further control the sharing process by setting one or more device-specific sharing parameters. In one embodiment, the user may set sharing parameters based on the content, source, rating, size, etc., of the media content. Alternatively or in addition, the user may limit the amount of memory or other resources available to the sharing process. For example, the user may set a sharing parameter that permits sharing only for audio files, refuses sharing for movies having a rating of "R" or higher, permits sharing for a selected few mobile devices, refuses sharing for media content requiring more than a predetermined amount of memory, refuses sharing when a predetermined amount of the memory resource has been used, permits sharing with family members, requires user input before sharing with non-family members, etc. The user may further set sharing parameters that define when the sharing mobile device 30A is available to the sharing process. For example, the user may prioritize those functions being implemented by the sharing mobile device 30A, e.g., phone calls, data transfers, etc., over sharing operations with requesting mobile devices 30B. The user of one or both of the sharing and requesting mobile devices 30A, 30B may further require user permission during the sharing process. The above examples only illustrate, and therefore, do not limit the invention described herein. It will be appreciated that some of the sharing parameters set by the user may be stored in the user profile unit 112 to facilitate the selection process.

Figure 4:
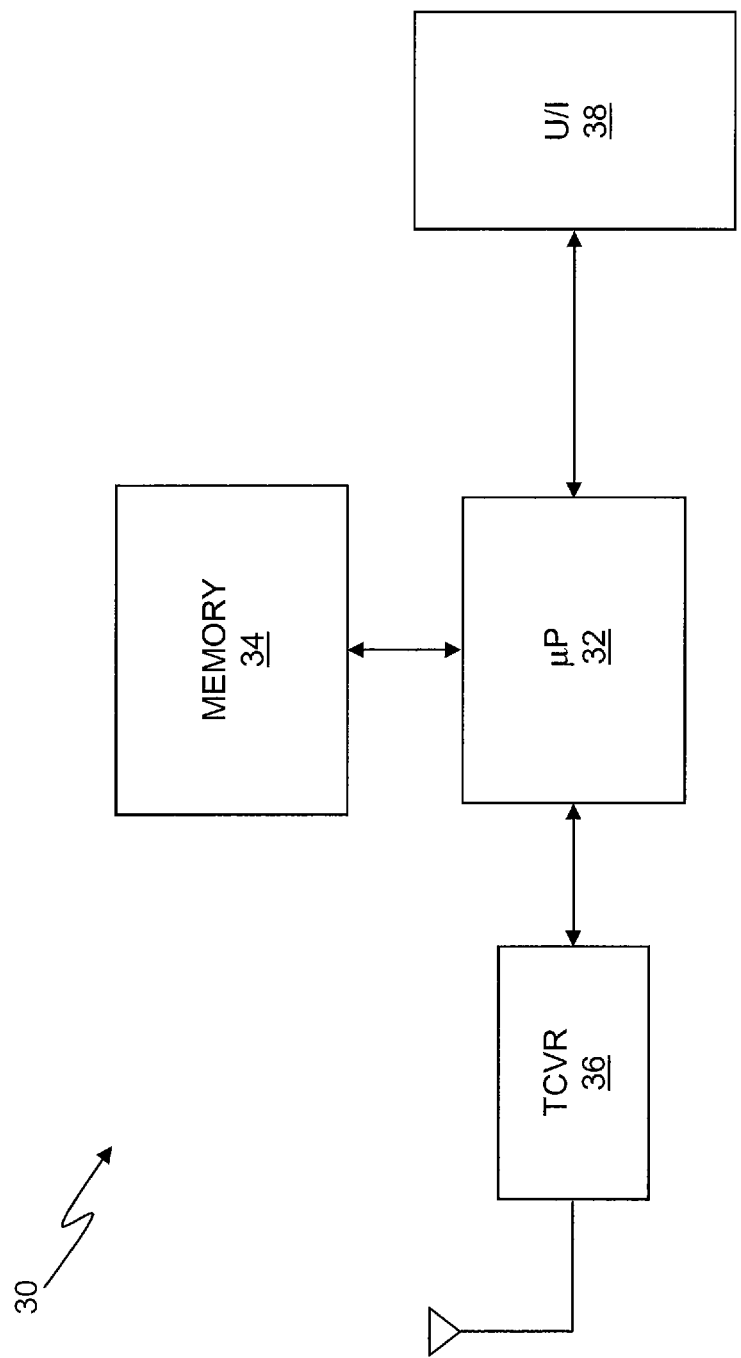
FIG. 4 shows one exemplary mobile device.

FIG. 4 shows one exemplary mobile device 30 that applies to both the sharing mobile device 30A and the requesting mobile device 30B. Mobile device 30 comprises a processor 32, memory 34, transceiver 36, and user interface 38. Processor 32 controls operation of the mobile device 30 according to instructions stored in memory 34. Transceiver 36 transmits and receives wireless signals over a short-range and/or long-range wireless link according to any known communication protocol. User interface 38 includes a display and a plurality of control keys that enable the user to interface with and control the mobile device 30.

Figure 5:
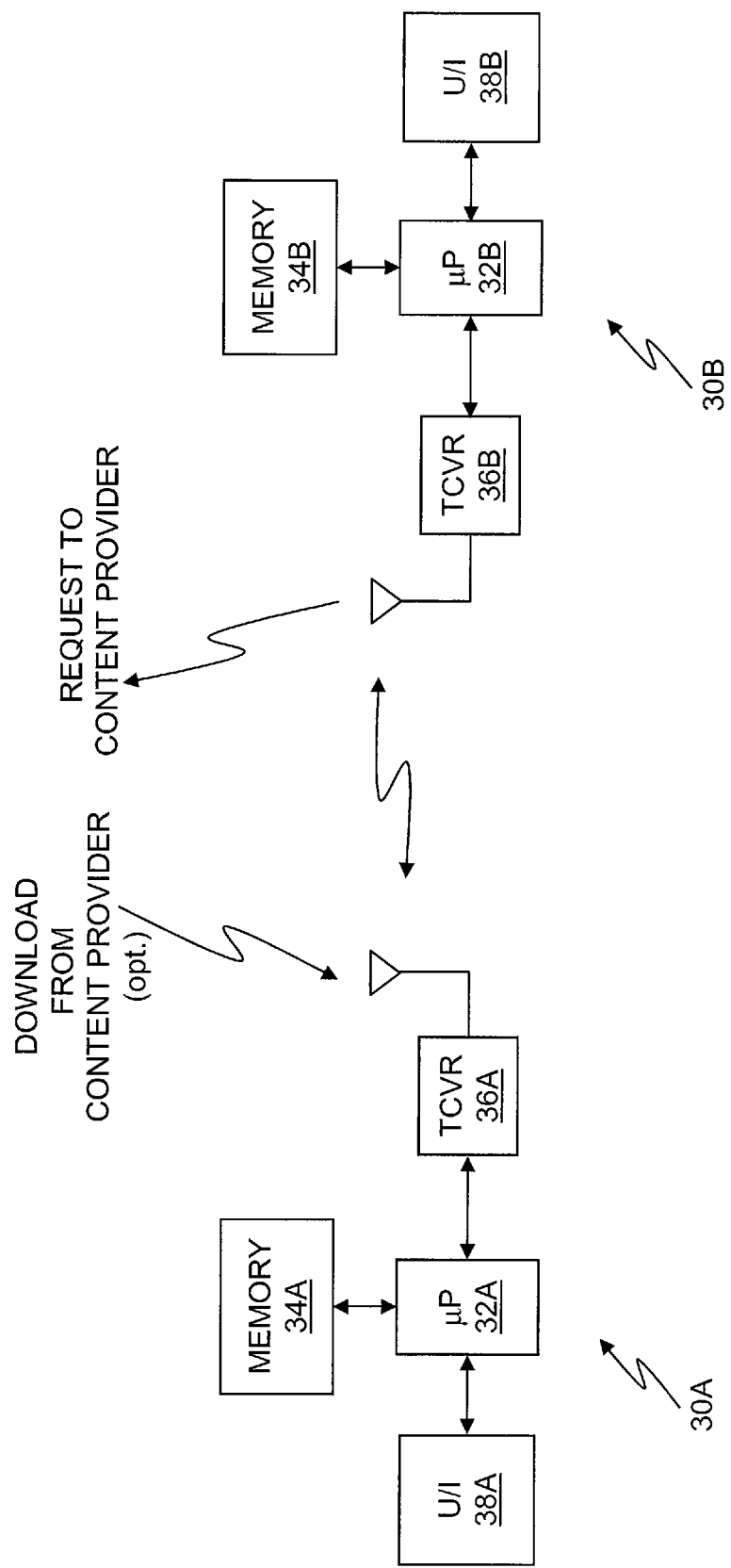
FIG. 5 shows exemplary sharing and requesting mobile devices.
Figure 7:
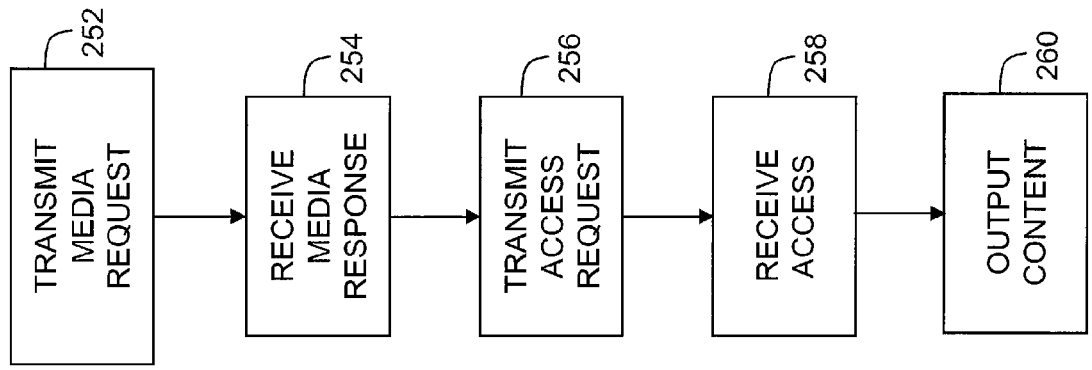
FIG. 7 shows an exemplary process for the requesting mobile device.
Figure 6:
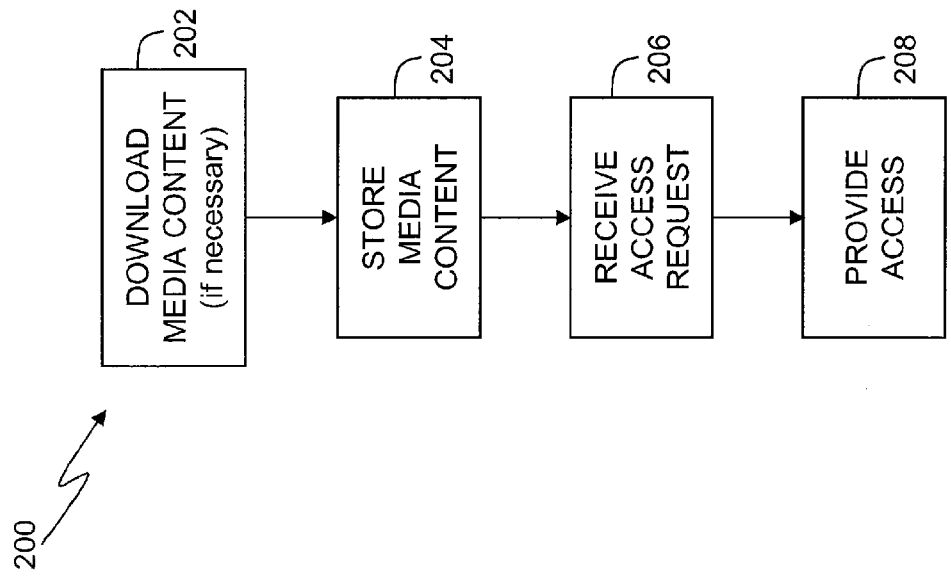
FIG. 6 shows an exemplary process for the sharing mobile device.

FIG. 5 shows exemplary mobile devices 30A, 30B implementing the processes 200, 250 shown in FIGS. 6 and 7, respectively. Sharing mobile device 30A comprises processor 32A, memory 34A, transceiver 36A, and user interface 38A and executes the process 200 shown in FIG. 6 to share access to desired media content with a requesting mobile device 30B. If necessary, the processor 32A controls transceiver 36A to download the media content requested by a requesting mobile device 30B (block 202). Subsequently, memory 34A stores the media content (block 204). Memory 34A may optionally also store one or more sharing parameters. The processor 32A controls transceiver 36A to receive an access request from the requesting mobile device 30B (block 206), and further controls the transceiver 36A to provide the requesting mobile device 30B with access to the desired media content (block 208) as discussed above.

Requesting mobile device comprises processor 32B, memory 34B, transceiver 36B, and user interface 38B and executes the process 250 shown in FIG. 7 to obtain access to desired media content from a sharing mobile device 30A. Accordingly, the processor 32B generates the media request and controls transceiver 36B to transmit and receive the media request and media response, respectively (blocks 252, 254). Processor 32B further controls the transceiver 36B to request and receive and access to the media content from the identified sharing mobile device 30A (blocks 256, 258), and controls the user interface 38B to output the accessed media content to the user (block 260).

The above-described sharing process encourages users to purchase higher-end mobile devices that have more technical features, such as more memory, by providing a reward when such resources are used to share access to media content with other mobile devices. Further, the above-described process may benefit the network operator by reducing the amount of resources, e.g., transmission power, bandwidth, etc., required to provide multiple mobile devices with access to the same media content. For example, once media content is stored in a sharing mobile device 30A, that media content may be accessed by other mobile devices 30C in the wireless communication system 100, dependent on the sharing parameters, as shown in FIG. 3. Further still, the sharing process described herein encourages users of requesting mobile devices 30B that would otherwise be unable to download media content to purchase access to the media content. It will be appreciated that some embodiments may allow the sharing mobile device 30A access to the downloaded media content free of charge or at a reduced rate when the media content is downloaded to the sharing mobile device 30A responsive to a media request from a remote mobile device, such as requesting mobile device 30B.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for sharing memory resources between a requesting mobile communication device and a sharing mobile communication device in a wireless communication system, the method comprising:
   receiving, at the sharing mobile communication device, a download request for media content from the requesting mobile communication device;
   downloading the requested media content from a content provider to the sharing mobile communication device responsive to the content provider receiving a download request for the media content from the requesting mobile communication device;
   receiving, at the sharing mobile communication device, an access request to access the downloaded media content from the requesting mobile communication device;
   providing the requesting mobile communication device with access to the downloaded media content responsive to the access request; and
   receiving, at the sharing mobile communication device, a reward from the content provider for providing the requesting mobile communication device with the access to the downloaded media content.

2. The method of claim 1 wherein providing the requesting mobile communication device with access to the media content comprises downloading or streaming the media content from the sharing mobile communication device to the requesting mobile communication device.

3. The method of claim 1 further comprising controlling one or more sharing parameters based on user input, wherein providing the requesting mobile communication device with access to the media content comprises providing the requesting mobile communication device with access to the media content when the one or more of the sharing parameters are satisfied.

4. The method of claim 3 wherein the sharing parameters define sharing limitations based on at least one of a type of the media content, a rating of the media content, and a size of the media content.

5. The method of claim 3 wherein the sharing parameters define at least one of a group of allowable requesting devices and an amount of memory allocated for storing the media content.

6. The method of claim 1 further comprising:
   receiving a second access request from a third mobile communication device;
   providing the third mobile communication device with access to the media content responsive to the second access request; and
   accruing a reward for providing the third mobile communication device with access to the media content.

7. A mobile communication device comprising:
   a memory; and
   a controller configured to:
      download media content from a content provider to the memory of the mobile communication device responsive to the content provider receiving a download request from the a remote mobile communication device;
      receive, at the mobile communication device, an access request from the remote mobile communication device to access the downloaded media content;
      provide the remote mobile communication device with access to the downloaded media content responsive to the access request; and receive, at the mobile communication device, a reward from the content provider for providing the remote mobile communication device with the access to the downloaded media content.

8. The mobile communication device of claim 7 wherein the controller provides the remote mobile communication device with access to the media content by downloading or streaming the media content to the remote mobile communication device.

9. The mobile communication device of claim 7 wherein the controller is further configured to control one or more sharing parameters based on user input, wherein the controller provides the remote mobile communication device with access to the media content by providing the remote mobile communication device with access to the media content when the one or more of the sharing parameters are satisfied.

10. The mobile communication device of claim 9 wherein the sharing parameters define sharing limitations based on at least one of a type of the media content, a rating of the media content, and a size of the media content.

11. The mobile communication device of claim 9 wherein the sharing parameters define at least one of a group of allowable remote communication devices and an amount of the memory allocated for storing the media content.

* * * * *